United States Patent [19]
Gonzalez et al.

[11] 3,940,237
[45] Feb. 24, 1976

[54] FURNACE EFFLUENT FILTER FOR A CARBON BAKING FURNACE

[75] Inventors: Juan M. Gonzalez; William V. Nichols, Jr., both of Portland, Oreg.

[73] Assignee: Reynolds Metals Company, Richmond, Va.

[22] Filed: Dec. 13, 1974

[21] Appl. No.: 532,740

[52] U.S. Cl. .............................. 432/72; 34/82; 55/99
[51] Int. Cl.² ............................................ F23J 15/00
[58] Field of Search .......... 432/2, 13, 72; 34/79, 80, 34/82; 55/99, 474

[56] References Cited
UNITED STATES PATENTS

| | | | |
|---|---|---|---|
| 3,220,165 | 11/1965 | Howie | 55/474 X |
| 3,526,483 | 9/1970 | Deussner et al. | 34/79 X |
| 3,645,515 | 2/1972 | Kemmetmueller | 432/72 |

*Primary Examiner*—John J. Camby
*Attorney, Agent, or Firm*—Glenn, Palmer, Lyne, Gibbs & Clark

[57] ABSTRACT

A carbon baking furnace is provided with a furnace effluent filter using as the filter medium a carbonaceous material of the type employed in making green carbon bodies to be baked in the furnace, and the used filter material is recovered in a form suitable for making such bodies. The filter unit includes a filter medium supply tube extending vertically downwardly into an enclosed funnel-shaped housing. An effluent inlet tube is coaxially arrayed within the filter medium supply tube. Fresh filter material is added to renew a bed thereof in the funnel-shaped housing, through the filter medium supply tube, and used filter material is withdrawn therefrom via a valve located at the base of the housing. Effluent from the furnace enters the filter via the effluent inlet tube, rises upwardly through the bed of filter material, disposed generally in the region where the filter material leaves the filter medium supply tube, and exits via an outlet tube located atop the funnel-shaped housing. Subsequent to performing its filtering function, the used filter material is recovered for use, preferably for products of the type processed in the furnace, or recycled through the filter and reused therein.

15 Claims, 5 Drawing Figures

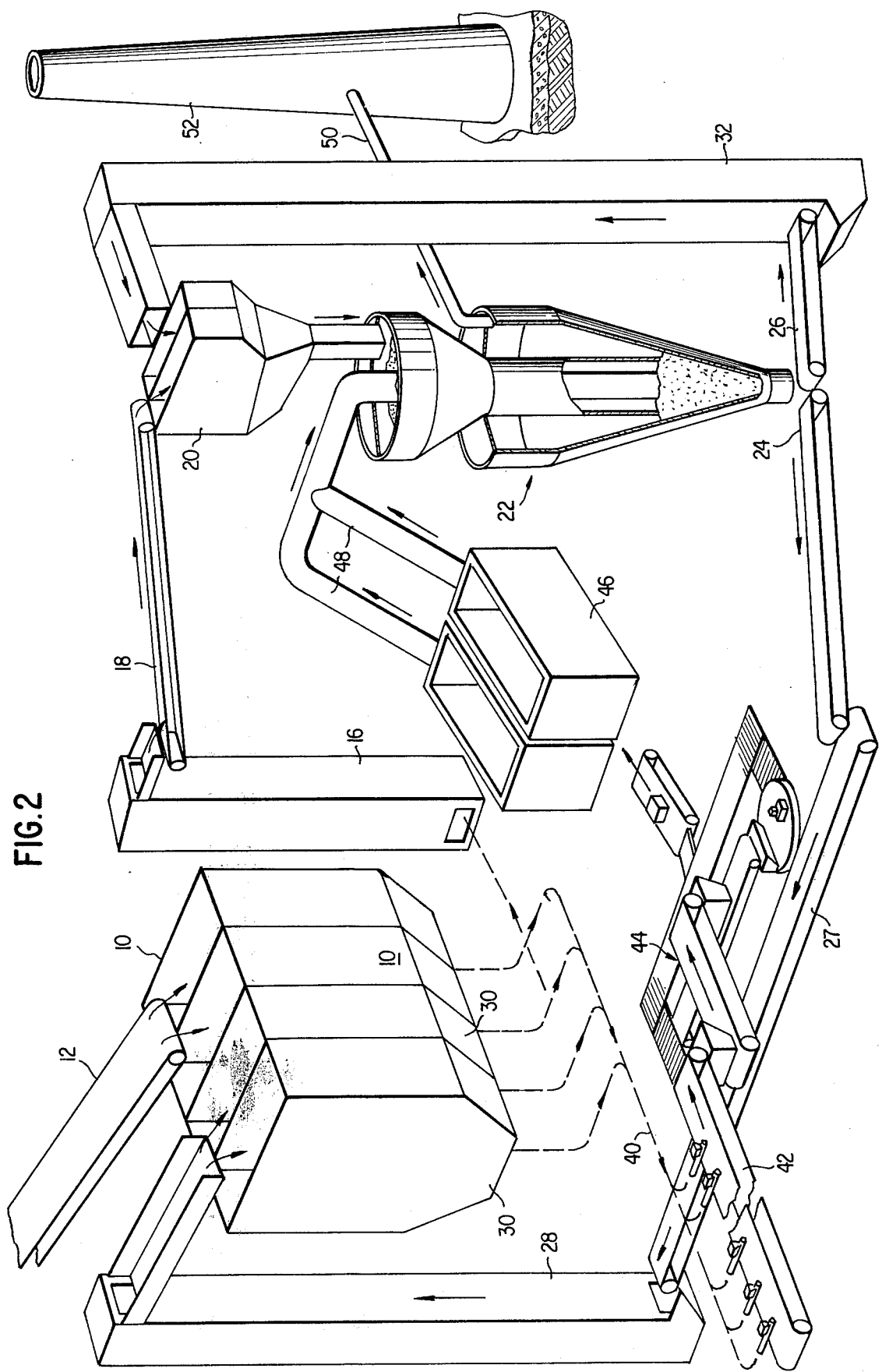

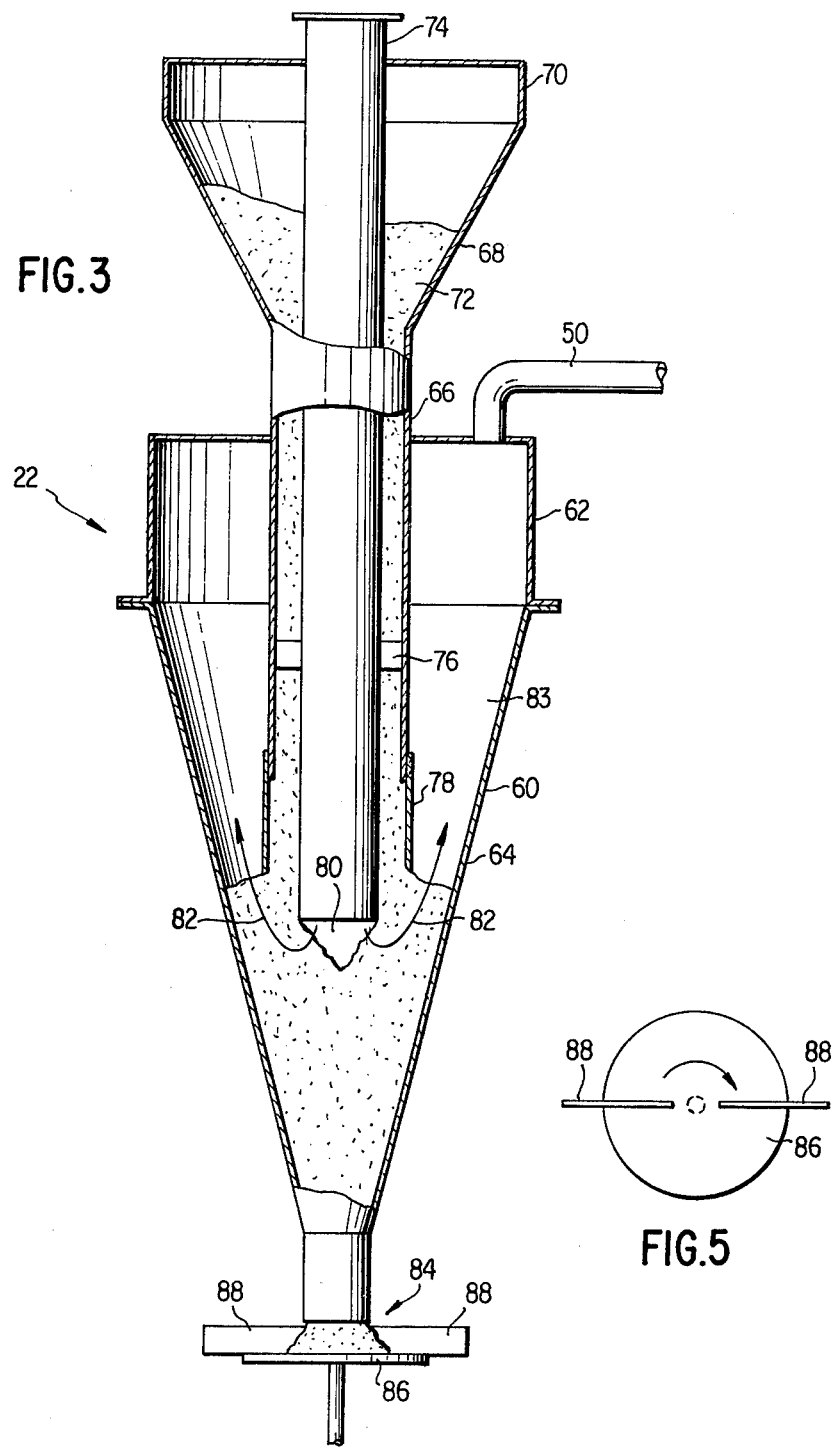

FURNACE EFFLUENT FILTER FOR A CARBON BAKING FURNACE

This invention is directed to an improved filter system and, more particularly, to an effluent filter for carbon baking operations wherein the filter material may be replenished continuously and the used material recovered for use in making baked carbon bodies.

As will be better understood from the following description, the present invention is of particular use in the manufacture of baked carbon articles, particularly anode blocks of the type used in aluminum reduction cells. The invention is useful in systems for manufacturing such articles because the filter medium employed is a component of the articles big anode, which are formed of a mixture of coke and pitch, for example, and the coke is suitable for use as the filter medium utilized by the filter of the invention. However, it will be appreciated by those skilled in the art and others that the invention can also be used in other environments.

With respect to the manufacture of baked carbon articles, particularly anode blocks of the type used in aluminum reduction cells, such articles are prepared by forming a mixture of carbonaceous aggregate (such as coke) and binder (such as pitch) into a suitable shape. The resultant green carbon body is then baked to carbonize the binder. During the baking step, hydrocarbon volatiles are released from the green carbon bodies. In addition to hydrocarbon volatiles, the furnace effluent also contains entrained solid particulate matter. The invention is directed to removing these materials from the furnace effluent prior to discharging the residual effluent gas into the atmosphere.

More specifically, the customary method of producing baked carbon anodes typically involves the steps of: molding a carbonaceous mixture into a desired shape to form green carbon bodies; loading the green carbon bodies into a ring-type furnace; packing the furnace pits with coke to support the carbon bodies and to protect against oxidation; and, baking the thusly supported and protected green carbon bodies at a temperature that gradually increases to about 750° – 800°C. for about 5 days. Thereafter, the baked carbon bodies are carefully heated further to about 1,100°C. during a curing period lasting about 40 hours. After the curing period, the furnace is cooled and the finished carbon anodes and the packing material are removed.

The green carbon body mixture comprises a suitable carbonizable material, such as a carbonaceous aggregate, in admixture with an effective binder, preferably a carbonizable anode paste of the type conventionally used for making aluminum reduction cell anodes. Suitable aggregates include petroleum coke, pitch coke and the like. Suitable binders include coal tar, coke oven pitch and petroleum pitch, for example. The portion of binder to aggregate will be generally at least about ten percent by weight and, more typically, lie in the range of about 11% to 16%. The aggregate is customarily of graded sizes, with the coarse fraction being on the order of $-4$ to $+20$ mesh (U.S. Standard).

Various methods and apparatus directed to removing hydrocarbon volatiles and particulate matter have been proposed by the prior art. However, these methods and apparatus have various disadvantages. For example, probably the most successful prior art apparatus for removing undesirable components from furnace effluents are electrostatic precipitators. Electrostatic precipitators create electrostatic fields that attract, and thereby remove, undesirable components from furnace effluents. The precipitator plates are then cleaned by water sprays, which wash the attracted materials from the plates into suitable receptacles. One of the major problems with such devices is the requirement that the resulting dirty water be cleaned, subsequent to its being used to clean the precipitator plates, but before it is returned to a stream, river or other ultimate disposal region. Another problem with electrostatic precipitators relates to their power requirements. Specifically, electric power must be applied to the precipitator plates and to the electric pumps used to spray the water over the plates. Obviously, the consumption of electric energy makes the use of these devices undesirable, particularly when compared to filter systems that do not consume large amounts of electric energy. Moreover, electrostatic prcipitators are somewhat expensive to manufacture and install.

In the past, it has been known that certain carbonaceous materials, such as coke and the like, can be utilized as a filter medium. The problem with the use of such materials in a furnace effluent environment is that they rapidly become clogged and, thus, most be continuously replaced. In order to alleviate this problem, it has been proposed to provide filters wherein such filter materials are continuously moved through the filter. In this manner, "clean" carbonaceous material is continuously presented to the effluent stream for filtering purposes. While a variety of devices that function in this manner have been proposed, none of them have been proven to be entirely satisfactory. In some such devices, the depth or thickness of the portion of the filter material through which the effluent gases pass has varied, with the result that one portion of the filter medium becomes clogged while another portion remains relatively clean. This causes high presssure regions in which filter material blowouts occur, i.e., a hole is created in the filter material. In some such devices, expensive mechanical systems, adapted to move the filter material through a housing, have been required. In other such devices, complicated, and often unsatisfactory, discharge control mechanisms have been required.

Therefore, it is an object of the invention to provide a new and improved furnace effluent filter.

It is another object of this invention to provide a new and improved furnace effluent filter wherein the filter material is continuously moved through the filter by gravity.

It is a further object of this invention to provide a furnace effluent filter that requires no complicated mechanical devices to move a recyclable filter material through a filter housing.

It is also an object of this invention to provide a new and improved furnace effluent filter that uses as a filter medium a material suitable for use in forming a carbonaceous product.

It is yet another object of this invention to provide a new and improved system for baking green carbon bodies so as to form aluminum reduction cell anodes that includes a furnace effluent filter having as its filter medium a material suitable for use in the carbonaceous aggregate portion of the green carbon bodies.

It is a still further object of this invention to provide a new and improved carbon anode baking system adapted to create aluminum reduction cell anodes wherein a carbonaceous material is first used in a new and improved filter to filter the effluent generated by a green carbon body baking furnace and then used to form green carbon bodies to be subsequently baked.

SUMMARY OF THE INVENTION

In accordance with the present invention, a furnace effluent filter useful in treating the furnace effluent generated during carbon baking operations and the like is provided. The filter uses a carbonaceous aggregate filter material and is designed such that the filter material is constantly moved by gravity through a filter housing. Preferably the filter material is the same as at least part of the aggregate used to form the carbon articles to be baked. The "used" filter material and the recovered effluent components can be utilized in the subsequent manufacture of the additional carbon articles. In one specific form, the filter material is a carbonaceous material of the type used to form the green carbon bodies. As known in the aluminum reduction cell anode making art, such a material preferably has a coarse fraction of the order of −4 to +20 mesh (U.S. Standard) in size. The filter using this material is effective to clean the effluent generated by a furnace used to bake such green carbon bodies. Filtering is achieved at minimal cost because used filter material is utilized in making additional baked carbon articles. In other words, the added expense created by the use of an expendable filter medium is avoided. Moreover, the above described disadvantages of an electrostatic precipitator do not exist.

In accordance with more specific principles of the present invention, a portion of the carbonaceous aggregate supply used to form green carbon bodies (e.g. the previously mentioned coarse fraction) is diverted first to the filter of the present invention where it is used to filter the furnace effluent generated during the baking of previously formed green carbon bodies. Then, some or all of the dirty filter material, which is still a carbonaceous aggregate, is transported to the place where the green carbon body formation process takes place and used to form additional green carbon bodies. Since the dirty carbonaceous aggregate includes recovered effluent components, the recovered components are also utilized to form the additional green carbon bodies. Because the entire process employs all available materials, very little waste exists whereby total filtering costs are reduced.

In accordance with the present invention, the furnace effluent filter comprises a filter medium supply tube that extends vertically downwardly into an enclosed funnel-shaped housing. An effluent inlet tube is longitudinally arrayed within the filter medium supply tube so as to direct effluent gases downwardly into the filter material as it exits from the filter medium supply tube. The effluent is cleaned as it rises through a bed of the filter material. The clean effluent gas leaves the funnel-shaped housing via an outlet tube located at or near the top of the funnel-shaped housing, in any event above the filter material. Clean filter material is added to the mass of filter material in the housing, periodically or continuously, under the force of gravity, and dirty filter material is similarly removed, also under the force of gravity, via a valve mechanism located at the base of the funnel-shaped housing. The valve mechanism, in turn, cooperates with suitable conveyors that either transport the recovered filter material to the place where the green carbon bodies are formed, or to a supply bin for furnishing filter material to the filter unit.

In accordance with further principles of this invention, the angle defined by the walls of the funnel-shaped housing is less than or equal to the angle of slide of the filter material.

It will be appreciated from the foregoing brief summary that the present invention provides an uncomplicated furnace effluent filter that has a variety of advantages over prior art filters, particularly those adapted to filter the effluent generated by a carbon article baking furnace. The funnel-shaped housing, in combination with gravity feed results in the provision of a constant flow filter that continuously presents a clean filter medium to the furnace effluent flow. The design of the filter is such that suitable filter material is constantly presented to the gas flow. Because the filter bed is regenerated in this fashion, pressure buildups, and a blowout of the filter material, are very unlikely. Because gravity moves the filter material through the housing, expensive mechanical filter material moving systems are not required. Finally, because the filter material is useful in forming the resultant product, waste is eliminated. Moreover, because waste is eliminated, the storage and disposal problems normally associated with an expendable (non-useful) filter medium do not exist.

BRIEF DESCRIPTION OF THE DRAWINGS

The foregoing objects and many of the attendant advantages of this invention will become more readily appreciated with reference to the following detailed description when taken in conjunction with the accompanying drawings wherein:

FIG. 2 is a schematic view of an improved carbon anode forming system including a baking furnace having the improved filter of the invention;

FIG. 3 is a cross-sectional view of a preferred embodiment of the filter aspect of the invention;

DESCRIPTION OF THE PREFERRED EMBODIMENTS

Figure 1:
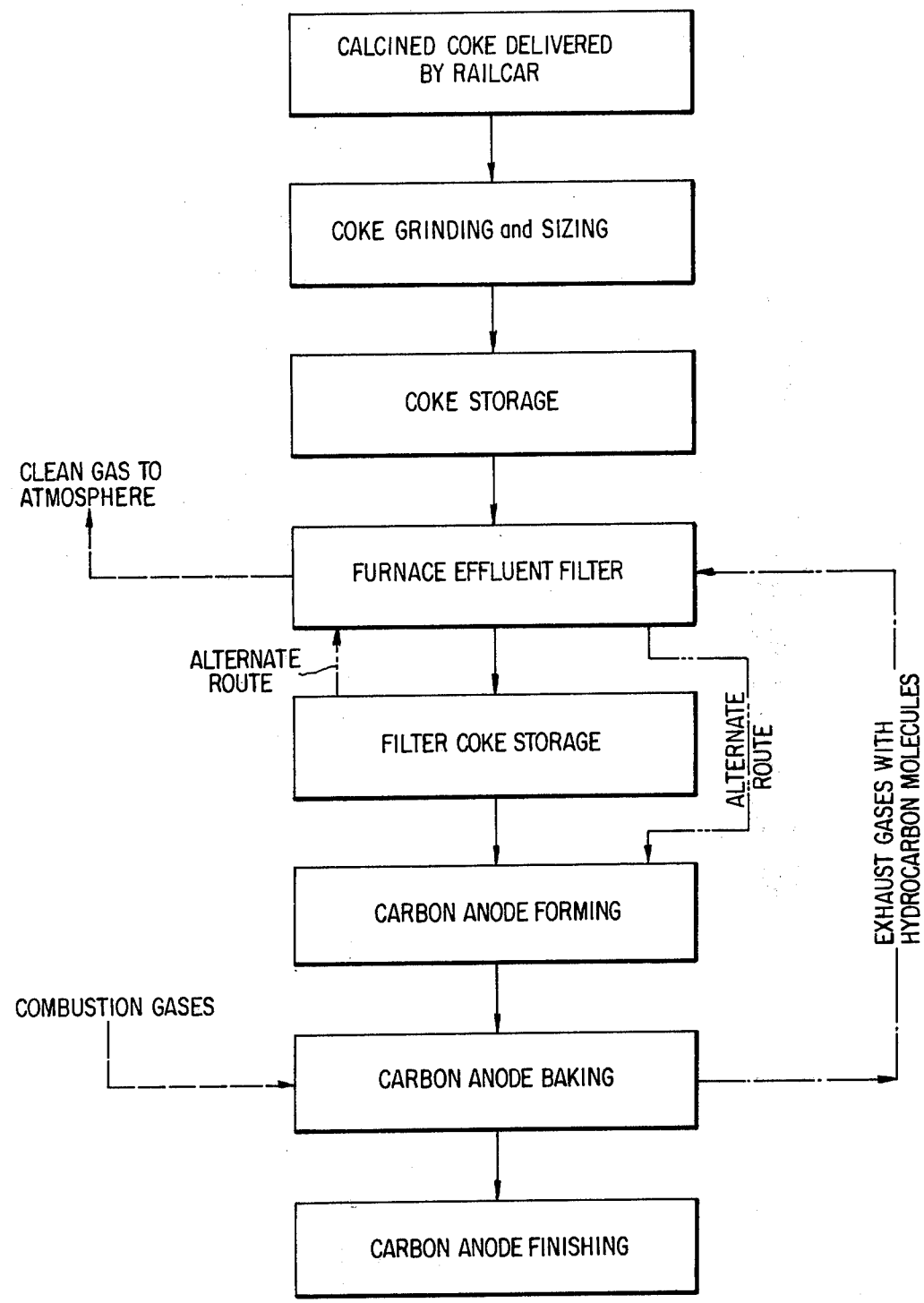
FIG. 1 is a flow diagram illustrating a process for forming carbon anodes, as modified in accordance with the present invention.

FIG. 1 is a flow diagram illustrating various stages of a carbon anode baking system from the time that coke is delivered to the carbon anode baking site until the time it becomes part of a finished carbon anode, i.e., an anode suitable for use in an aluminum reduction cell. The flow diagram illustrates the incorporation of an effluent filter of the invention in the overall carbon anode baking process. In general, calcined coke is delivered by a suitable means, such as a railroad car, to the carbon anode baking site. At the site, the coke is ground and sized, as necessary. Alternatively, the grinding and sizing steps may be performed before the coke is delivered. In any event, the sized coke or other carbonaceous aggregate is stored in suitable storage bins or other containers. As needed, the coke is removed from these storage bins and supplied to the hereinafter described furnace effluent coke filter, for use in accordance with the invention.

After the coke passes through the filter it is either stored in a suitable filter coke storage bin or other container, or transported directly to a carbon anode forming site (as illustrated by the alternative path). The stored filter coke, as needed, is transported to the carbon anode forming site. If desired, some of the stored filter coke can be recycled back to the furnace effluent filter, as illustrated by another alternate path. In any event, sooner or later the filter coke is delivered to the carbon anode forming site. At the carbon anode forming site green carbon bodies are formed. The green carbon bodies are transported to a furnace and packed in the furnace pits. In the furnace, the green carbon bodies are baked in the manner well known in the aluminum reduction cell anode forming art. Combustion gases, generated by the furnace during the carbon anode baking step, are directed through the furnace effluent filter of the invention. The filter removes volatile hydrocarbons and particulate matter, and the filtered effluent gas is exhausted to the atmosphere. After the baking step is completed, the baked carbon anodes are removed from the furnace and transported to a carbon anode finishing site for the remaining operations.

Certain advantages of the present invention will be readily appreciated from the foregoing description. First, there is essentially no waste. All of the coke (carbonaceous aggregate), including volatile hydrocarbons and particulate matter released into the furnace effluent, is consumed, because the filter coke ends up as part of a carbon anode. Second, the system is flexible. Coke, after being used to form a filter medium can either be reused to perform the same function or it can be immediately used to form a green carbon body. Third, because consumable coke is used as the filter element, the problems associated with electrical precipitators and the like do not exist. Fourth, very little additional storage, over and above that normally associated with a carbon anode baking operation, is needed.

FIG. 2 is a schematic diagram generally illustrating the process functionally illustrated in FIG. 1 and described above. In FIG. 2 the sized clean coke (carbonaceous material) is transported to clean coke storage bins 10 by a delivery conveyor 12. As needed, clean coke is removed from the clean coke storage bins 10 and transported along a path of travel designated by dashed line 14 to a coke elevator 16. The coke elevator raises the clean coke to a filter delivery conveyor 18 which delivers the clean coke to a filter feed bin 20. The filter feed bin 20 is vertically mounted above the filter 22 and delivers coke thereto.

The clean coke flows through the filter 22 under gravitational force and exhausts therefrom at the bottom of the filter as dirty coke. The dirty coke is picked up by one of two exhaust conveyors 24 or 26. The first exhaust conveyor 24 transports the dirty coke it receives to a third conveyor 27, which runs to a storage elevator 28. The storage elevator 28 raises the dirty or filter coke and delivers it to dirty coke storage bins 30.

The second exhaust conveyor 26 transports the dirty or filter coke it receives to a filter return elevator 32. The filter return elevator raises the dirty coke and returns it to the filter feed bin 20 where it is mixed with clean coke before being recycled through the filter. It should be noted here that the coke can be recycled through the filter several times without any detrimental filtering effect occuring because the shifting of the coke during the recycling operation presents new coke surfaces to the effluent during subsequent passage through the filter. Thus, removed dirty coke is reusable for several cycles of operation, particularly if unused, entirely clean coke is added.

Whether or not the first or second exhaust conveyors 24 or 26 receive discharged dirty coke depends upon the desired mode of operation. In some cases, it may be desirable to recycle all of the dirty coke back through the filter. In other instances it may be desirable that none of the dirty coke is recycled. Still further, it may be desirable that some of the coke is recycled and the rest is not recycled. The invention can accommodate any of these modes of operation.

Coke from the clean coke bins 10 and the dirty coke bins 30 is mixed as desired (illustrated by the dash line 40) and transported by a further conveyor system 42 through a green carbon body forming site 44 to a furnace 46. The green carbon bodies are baked in the furnace 46 in a conventional manner. Exhaust pipes 48 carry the furnace effluent to the filter 22 where it is cleaned in the manner hereinafter described. A further pipe 50 carries the cleaned effluent from the filter 22 to an exhaust stack 52 from which it enters the atmosphere.

Since the mixing of carbonaceous aggregate with a binder and the subsequent forming of green carbon bodies and their subsequent baking in the furnaces involve conventional steps and procedures which are well known, they are not discussed here. However, it will be apparent from the foregoing description that the overall system accomplishes the production of baked carbon anodes in a manner that uses the basic raw material involved in an improved manner. Specifically, previously wasted effluents (volatile hydrocarbons and particulate matter) generated during the carbon baking operation are largely retained in the system because the filter medium utilized for capturing the effluent ends up as a portion of the resultant product. Because such effluents are retained and reused, the resultant cost of baked carbon anodes is reduced.

FIG. 3 illustrates a preferred embodiment of an effluent filter 22 formed in accordance with the present invention, including a tank 60 having a cylindrical upper portion 62 and a funnel-shaped lower portion 64. The upper portion 62 is enclosed. Axially aligned and projected downwardly into the cylindrical upper portion 62 is a filter medium supply tube 66. The upper end of supply tube 66 diverges outwardly so as to define an inverted, truncated cone-shaped portion 68. The cone-shaped portion 68 is topped by a cylindrical upper portion 70. The cylindrical upper portion 70 of the supply tube 66 is enclosed, the enclosure including a suitable aperture (not shown) through which coke 72 enters under the force of gravity. As will be understood for the previous description, the incoming coke is supplied from the filter feed bin 20 (see FIG. 2).

Centrally aligned within the filter medium supply tube 66 is at effluent inlet tube 74. One or more braces 76 support the effluent inlet tube 74 in its aligned vertical position. The braces 76 are perforated to allow the coke 72 to readily flow through the annular passageway defined by the outer surface of the effluent inlet tube 74 and the inner surface of the filter medium supply tube 66. Preferably, the effluent inlet tube 74 extends slightly beyond the lower end of the recovery medium supply tube 66.

A vertically adjustable sleeve 78 surrounds the lower tip of the filter medium supply tube 66. The position of the vertically adjustable sleeve controls the point at which the coke exhausts from the supply tube. The rate of gravity flow of the coke through the effluent filter 22 is controlled in the manner hereinafter described and is such that an inverted cone-shaped cavity 80 is formed at the lower tip of the effluent inlet tube 74. Effluent exhausting from the effluent inlet tube 74 passes through the inverted cone-shaped cavity and then rises through the coke surrounding it, as illustrated by the arrows 82. The rising effluent enters an enclosed chamber 83 defined by the filter tank 60, particularly the cylindrical upper portion 62 and the upper region of the funnel-shaped lower portion 64. The filtered effluent leaves the effluent filter via the outlet tube 50, which is located atop the cylindrical upper portion 62.

The used filter coke is withdrawn from the bottom of the funnel portion 64 through an exhaust valve 84. The exhaust valve 84 is further illustrated in FIG. 5 and comprises a circular rotatable plate 86 and a pair of inwardly projecting vanes 88. The vanes are fixed in position, during normal operation but are movable inwardly and outwardly to adjust their relative spacing. They are not attached to the rotatable plate. The vanes 88 are positioned above the circular rotatable plate 86 and the first and second conveyors 24 and 26 illustrated in FIG. 2. In operation, the plate 86 is rotated by a suitable drive mechanism (not shown). The vanes 88, depending upon the extent of their inward projection position, cause a predetermined portion of the coke, which drops onto the plate due to gravity, to be withdrawn. Withdrawal of some of the coke from the plate allows more coke to drop onto the plate under the effect of gravity. Consequently, controlling the rate of removal controls the rate of coke passage through the effluent filter 22. In this manner an uncomplicated constant flow filter system is provided. No mechanical means, such as agitators, for example, are required to move the coke. The angle of slide of the coke, which is dictated by its size and nature, is coordinated with the filter unit construction so as to be greater than or equal to the angle defined by the sides of the funnel-shaped portion 64 of the filter tank.

Figure 4:
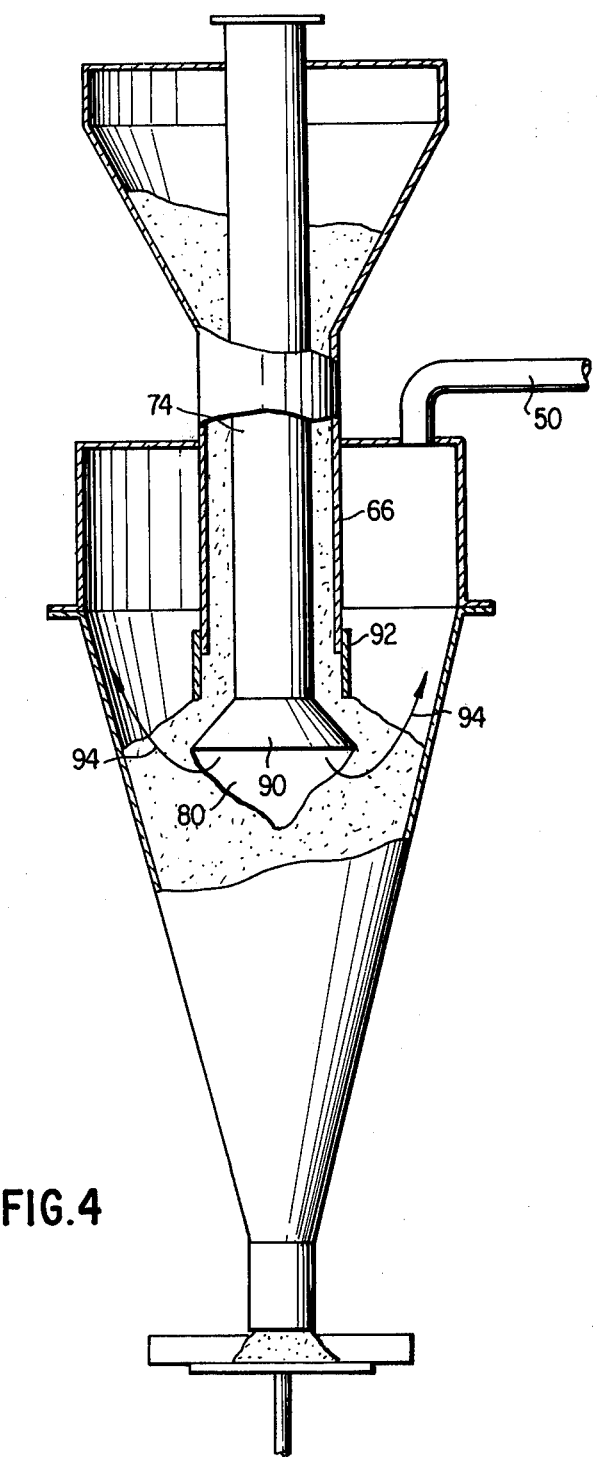
FIG. 4 is a cross-sectional view of an alternate preferred embodiment of the filter aspect of the invention; and, FIG. 5 is a top or plan view of a valve mechanism suitable for controlling the rate of discharge of the filter medium from the filter unit of the invention.

FIG. 4 is an alternate preferred embodiment of an effluent filter structure formed in accordance with the invention. The FIG. 4 embodiment is substantially identical to the FIG. 3 embodiment except that a rim 90 is located at the base of the effluent inlet tube 74. The rim 90 is in the form of a truncated cone and causes the coke to be diverted outwardly as it emerges from the filter medium supply tube 66. In this manner the size of the inverted cone-shaped cavity 80 is increased. Again, a sleeve 92, which is movable upwardly and downwardly, controls the thickness of the coke path through which the effluent gases rise, as illustrated by the arrows 94.

It will be appreciated from the foregoing description that the invention provides an uncomplicated effluent filter. Even though gravity is the main force employed, the filter is effective to present a constantly clean filter medium surface to effluent gases. Moreover, because the recovery medium (coke aggregate) is constantly changing and continuously presenting relatively clean coke to the effluent, blowout problems are substantially reduced. The invention finds its primary use in a carbon baking system to provide improved effluent treatment without substantially increasing the overall cost. In fact, the invention tends to reduce material costs because it recovers hydrocarbon volatiles and particulate matter that were previously exhausted to the atmosphere or removed by an electrostatic precipitator in a generally nonrecoverable manner. Hence, the invention results in the provision of a substantially waste-free carbon anode baking system.

While the presently preferred embodiments of the invention have been illustrated and described, it will be recognized that various changes can be made therein without departing from the spirit and scope of the invention. Hence, the invention can be practiced otherwise than as specifically described herein.

What is claimed is:

1. In a carbon baking system having a furnace, and means for mixing carbonaceous aggregate with a suitable binder and forming the mixture into green carbon bodies for baking in said furnace at elevated temperature, the improvement comprising a filter unit for treating the furnace effluent using a bed of carbonaceous aggregate as the filter medium, with provision to recover the used carbonaceous filter material from said filter unit in a form suitable for making such green carbon bodies, said furnace effluent filter including:
   a vertically arrayed funnel-shaped housing through which said carbonaceous aggregate moves under the force of gravity;
   means for supplying the carbonaceous aggregate to maintain a bed thereof within said funnel-shaped housing;
   means located at the base of said funnel-shaped housing for controlling the withdrawal of carbonaceous aggregate from said funnel-shaped housing;
   an effluent entrance conduit vertically mounted in said funnel-shaped housing for directing the effluent generated by said furnace into the bed of carbonaceous aggregate located in said funnel-shaped housing; and,
   an outlet conduit for discharging the treated effleunt gas to atmosphere after it has passed through a mass of said carbonaceous aggregate.

2. An improved carbon baking system as claimed in claim 1 including a vertical filter medium conduit surrounding said effluent entrance conduit in a manner such that the region between said vertical filter medium conduit and said effluent entrance conduit defines a passageway through which said carbonaceous aggregate enters said funnel-shaped housing.

3. An improved carbon baking system as claimed in claim 2 including control means associated with said vertical filter medium conduit for controlling the depth of a bed of the carbonaceous aggregate through which said effluent passes.

4. An improved carbon baking system as claimed in claim 3 wherein said control means for controlling the depth of a bed of the carbonaceous aggregate through which said effluent passes comprises a sleeve at the lower end of said vertical filter medium conduit.

5. An improved carbon baking system as claimed in claim 2 including means adjoining the lower end of said effluent entrance conduit for distributing said carbonaceous aggregate outwardly as it exits from the passageway through which it enters said funnel-shaped housing.

6. An improved carbon baking system as claimed in claim 5 wherein said distributing means comprises a truncated conical shaped rim adjacent the lower end of said effluent entrance conduit.

7. An improved carbon baking system as claimed in claim 2 including a supply bin mounted above said vertically arrayed funnel-shaped housing for supplying the carbonaceous aggregate to said vertically arrayed funnel-shaped housing via the passageway located between said vertical filter medium conduit and said effluent entrance conduit.

8. An improved carbon baking system as claimed in claim 7 including first conveyor means for moving said carbonaceous aggregate exiting from said funnel-shaped housing to the site where said green carbon bodies are formed.

9. An improved carbon baking system as claimed in claim 8 including second conveyor means for moving said carbonaceous aggregate exiting from said funnel-shaped housing to said supply bin above the funnel-shaped housing.

10. A carbon baking furnace and associated filter system for treating furnace effluent using carbonaceous aggregate as a filter medium, said filter system comprising:
a vertically arrayed funnel-shaped housing through which said carbonaceous aggregate moves under the force of gravity, the angle defined by the walls of said funnel-shaped housing being less than or equal to the angle of slide of said carbonaceous aggregate;
means for supplying the carbonaceous aggregate to maintain a bed thereof within said funnel-shaped housing;
a valve located at the base of said funnel-shaped housing for regulating the rate of withdrawal of carbonaceous aggregate from said funnel-shaped housing;
an effluent entrance conduit for directing the effluent generated by said furnace downwardly within the bed of carbonaceous aggregate located in said funnel-shaped housing; and,
an outlet conduit for removing the treated effluent gas after it has passed through a mass of said carbonaceous aggregate.

11. A furnace filter system as claimed in claim 10 including a vertical filter medium conduit surrounding said effluent entrance conduit in a manner such that the region between said vertical filter medium conduit and said effluent entrance conduit defines a passageway through which said carbonaceous aggregate enters said funnel-shaped housing.

12. A filter system as claimed in claim 11 including control means associated with said vertical filter medium conduit for controlling the depth of a bed of the carbonaceous aggregate through which said effluent passes.

13. A filter system as claimed in claim 12 wherein said control means for controlling the depth of a bed of the carbonaceous aggregate through which said effluent passes comprises a sleeve at the lower end of said vertical filter medium conduit.

14. A filter system as claimed in claim 10 including means adjoining the lower end of said effluent entrance conduit for distributing said carbonaceous aggregate outwardly as it exits from the passageway through which it enters said funnel-shaped housing.

15. A filter system as claimed in claim 14 wherein said distributing means comprises a truncated conical shaped rim adjacent the lower end of said effluent entrance conduit.

* * * * *